United States Patent [19]

Peeters et al.

[11] Patent Number: 4,705,391

[45] **Date of Patent: * Nov. 10, 1987**

[54] METHOD AND DEVICE FOR CONTROLLING AN IMAGE FORMING DEVICE

[75] Inventors: Hendrikus W. J. Peeters, AK Helden; Hendricus M. J. C. van Kuringen, JC Venlo; Gerardus M. Hoeymakers, JJ Horst, all of Netherlands

[73] Assignee: Oce-Nederland B.V., Venlo, Switzerland

[ * ] Notice: The portion of the term of this patent subsequent to Jun. 3, 2003 has been disclaimed.

[21] Appl. No.: 785,838

[22] Filed: Oct. 9, 1985

[51] Int. Cl.[4] .................... G03G 13/00; G03B 27/32

[52] U.S. Cl. .................................. 355/77; 355/14 R; 355/40

[58] Field of Search ................. 355/3 R, 3 TR, 14 R, 355/40, 77

[56] References Cited

U.S. PATENT DOCUMENTS

| | | | |
|---|---|---|---|
| 4,110,033 | 8/1978 | Ophey | 355/14 R |
| 4,174,905 | 11/1979 | DiFrancesco et al. | 355/14 R |
| 4,592,641 | 6/1986 | Roelofs et al. | 355/3 TR |

*Primary Examiner*—Fred L. Braun

*Attorney, Agent, or Firm*—Reed Smith Shaw & McClay

[57] ABSTRACT

A method and device for controlling an image forming device in which image forming stations can form an image on a medium that is advanced past these stations. For each image under formation, the positions occupied by the leading and trailing edges are registered with respect to the image forming stations. Signals for controlling the image forming stations are generated depending upon the positions registered. In doing so, the positions of the leading and trailing edges are compared with predetermined positions belonging to a first and second group respectively. If two compared positions correspond to one another, a control signal will be generated that is associated with the specific predetemined position used for the comparison.

2 Claims, 18 Drawing Figures

METHOD AND DEVICE FOR CONTROLLING AN IMAGE FORMING DEVICE

BACKGROUND OF THE INVENTION

1. Field of the Invention

The present invention relates to a method for controlling an image forming device. The invention also relates to a device for performing this method of control.

2. Description of the Prior Art

U.S. Pat. No. 3,944,360 discloses a method for controlling an image forming device in which images can be formed on an advancing medium. The position of an image on the medium with respect to an initial position thereon is registerd by counting periods of a pulse signal, the frequency of which is proportional to the speed at which the medium is advanced. The registered positions are repeatedly compared with a number of predetermined positions, and control signals are generated if the compared positions are identical.

In this method, the length of the image to be formed must be known before the start of the image forming operation. The image length, however, is dependent upon the length of the original and the imaging ratio. To determine the image length, it is necessary, therefore, for the image forming device operator to input data concerning the original length beforehand or for the image forming device to be provided with a length measuring device which can determine the original length before the start of the image forming operation.

The use of the method of U.S. Pat. No. 3,944,360 for controlling image forming devices in which an original of arbitrary length (e.g. a working drawing) is taken along an exposure slit for image forming purposes has the disadvantages that both the inputting of the original length and the predetermination of the original length by means of a length measuring device are impracticable. The disadvantage of the operator inputting the original length is that the operator always has to determine the original length himself before inputting the data.

Length measuring devices which can determine the original length before the start of the image forming operation have the disadvantage that they can determine only original lengths less than a predetermined length which is limited by the size of the measuring device. This is an inherent disadvantage for length determination of working drawings in which lengths of one meter or more are not unusual. Standard length measuring devices are unuseable in practice for measuring such long originals because of the size required.

It is, thus, an object of the invention to provide a method and a device for implementing this method which does not have the above disadvantages.

SUMMARY OF THE INVENTION

The present invention relates to a method for controlling an image forming device in which images can be formed on an advancing medium. The position of an image on the medium with respect to an initial position thereon is registered by counting periods of a pulse signal, the frequency of which is proportional to the speed at which the medium is advanced. The registered positions are repeatedly compared with a number of predetermined positions, and control signals are generated if the compared positions are identical. The method is further characterized in that both a first position related to the leading edge of the image and a second position related to the trailing edge of the image are registered for each image under formation in the device, the predetermined positions are divided up into a first and a second group, each first registered position is compared with the predetermined positions from the first group, and each second registered position is compared with the predetermined positions from the second group.

In the method according to the present invention, the location of the trailing edge of the image does not need to be known until the moment the first control signal dependent upon the position of the trailing edge has to be generated. In an image forming device having an original throughput and a slit exposure, this moment is before the time at which the trailing edge of an original reaches a predetermined distance from the exposure slit. As long as the distance between the exposure slit and the trailing edge is greater than said predetermined distance, a knowledge of the position of the leading edge of the image is sufficient to generate control signals. By using the method of the present invention in an image forming device having a slit exposure and an original throughput, image forming can start before the length of the image to be formed is known. Thus, there is no need to use bulky length measuring devices or for the operator to input the original length.

The device for implementing the above-described method of controlling an image forming device has a memory, a pulse generator for generating the pulse signal, a means for comparing the registered positions with the predetermined positions and a means for generating control signals when the compared positions are identical, wherein the predetermined positions belonging to the first group are stored in a first part of the memory, the predetermined positions belonging to the second group are stored in a second part of the memory and the device is provided with counting means which register the first and second positions for each image under formation in the device.

The invention and its further advantages will be apparent from the detailed description hereinafter and with reference to the accompanying drawings.

BRIEF DESCRIPTION OF THE DRAWINGS

FIGS. 5 to 13 represent the flow diagrams of the control programs carried out by the control means.

FIG. 5 is the flow diagram of the routine for controlling the feeding of an original.

FIG. 6 is the flow diagram of the copy table filling routine.

FIG. 8 is the flow diagram for the exposure intensity adjusting routine.

FIG. 9 is the flow diagram of the action routine for performing the last action to form a copy.

FIG. 10 is the flow diagram for activating dummy copy lamp 51.

FIG. 11 is the flow diagram for activating paper stop 50.

FIG. 12 is the flow diagram for deactivating corona device 23.

FIG. 13 is the flow diagram of the belt stop routing.

DESCRIPTION OF THE PREFERRED EMBODIMENTS

A. The Copying Machine

Figure 1:
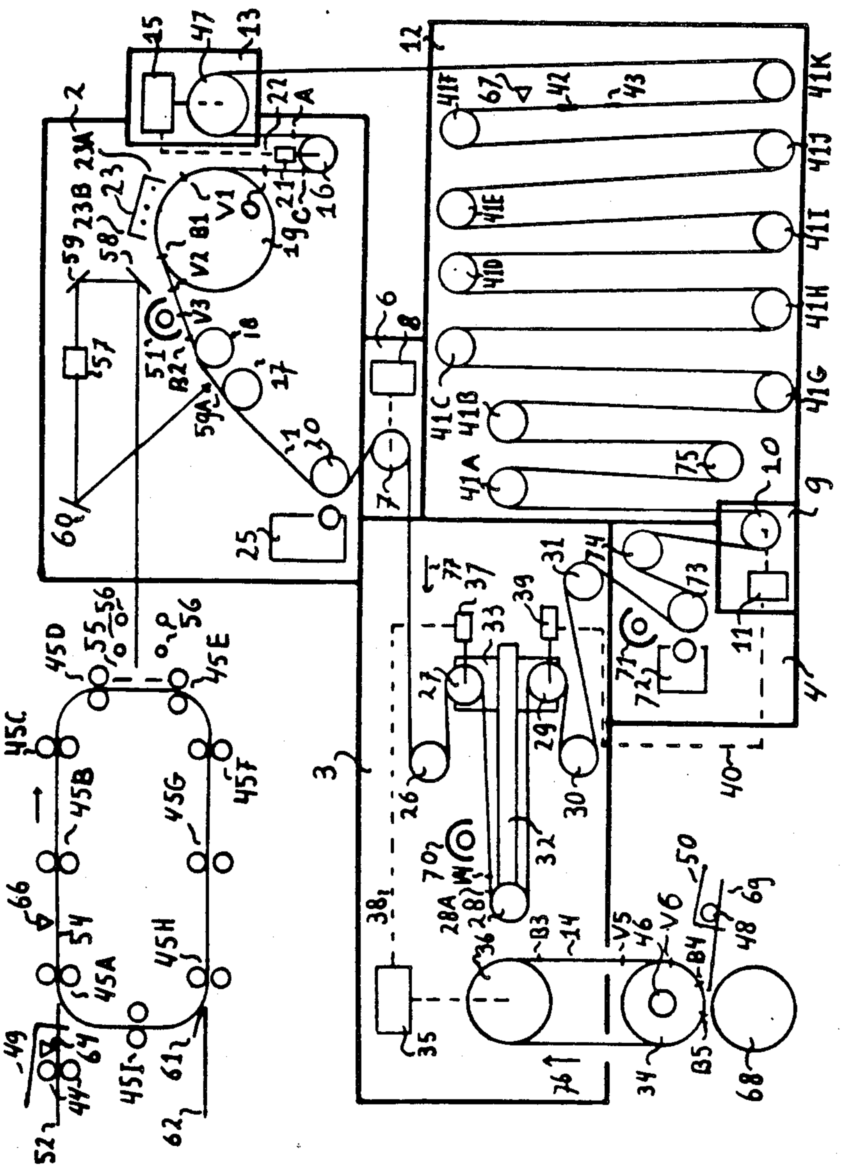
FIG. 1 is a cross-section of part of an electrophotographic apparatus in the form of a copying machine.

FIG. 1 represents a cross-section of part of a copying machine. An original can be fed via drive rollers 44 along an entry path 52 into an endless path 54. A stop 49 is provided just past drive rollers 44 and can be lifted by an electrically controllable actuating means. An original supplied along entry path 52 can be retained by means of stop 49. Drive rollers 45A to 45I are disposed along path 54 and take the original along path 54. The original is taken at a uniform speed past an exposure slit 55.

A switch 61 is disposed just past rollers 45H and can be set to a first and a second position. In the first position, the original is deflected in the direction of an exit path 62 so that the original leaves path 54. In the second position, the original is deflected in the direction of the rollers 45I so that the original agains passes exposure slit 55.

The portion of the original behind slit 55 is exposed by lamps 56. The image of this exposed portion is projected by means of a lens 57 and mirrors 58, 59 and 60 onto a photoconductive belt 1 at an exposure place 59A. Belt 1 is advanced in the direction of arrow 77 at a speed which is in synchronism with the speed of the original.

The path covered by belt 1 comprises an image-forming section 2 in which a powder image is formed on belt 1 electrophotographically, a first belt drive section 6 in which belt 1 is driven by a drive roller 7 and a synchronous motor 8 connected to the main power supply, an image transfer section 3 in which the powder image can be transferred to an intermediate support 14, a cleaning section 4 in which any powder residues remaining on belt 1 are removed, a second belt drive sectio 9 in which belt 1 is driven by a drive roller 10 and a servo-system 11, a meander section 12 and a third belt drive section 13 in which belt 1 is driven by a drive roller 47 and a servo-system 15.

In the image-forming section 2, belt 1 is drawn by synchronous motor 8 over a freely rotatable guide roller 16 and stationary guide rollers 17, 18, 19 and 20 at a uniform speed. Guide roller 16 is freely moveable vertically. A displacement pick-up 21 is secured to the shaft of roller 16 and delivers a voltage VL3 which indicates the displacement of roller 16 with respect to a predetermined position. The displacement pick-up is so constructed that the magnitude of the voltage VL3 falls when roller 16 is displaced downwardly. Voltage VL3 is delivered via a signal line 22 to servo-system 15.

Servo-system 15 drives belt 1 at a speed proportional to the voltage VL3. Servo-system 15 and displacement pick-up 21 together form a feed-back control system by means of which roller 16 is kept in a state of equilibrium by adjusting the speed of belt 1.

Disposed along the path of belt 1 inside image-forming section 2 are a corona charging device 23, projection means 57 to 60 and a magnetic brush developing device 25. Belt 1 is uniformly charged by means of corona charging device 23. Belt 1 is locally discharged by projection means 57 to 60 which projects a light image of the original moving along exposure slit 55 so that a charge image corresponding to the original is formed on belt 1. A powder image is formed by magnetic brush developing device 25 by applying powder to the charge image.

In image transfer section 3, belt 1 is taken along freely rotatable guide rollers 26 to 31. Roller 28 is secured to a horizontally moveable block 32. Intermediate support 14 is disposed opposite roller 28. Intermediate support 14 consists of an endless belt made from silicone rubber trained over a drive roller 36 and a guide roller 34. Roller 36 is driven in the direction of arrow 76 by a servo-system 35. A heating element 46 is disposed inside roller 34 to heat intermediate support 14 via the surface of roller 34.

Roller 28 can be brought into three positions by displacement of block 32. The three positions are: (1) a position of rest in which roller 28 is distant from intermediate support 14; (2) an auxiliary position in which roller 28 is situated in the direct vicinity of intermediate support 14 but in which belt 1 is not in contact with intermediate support 14; and (3) a transfer position in which belt 1 is pressed by roller 28 against intermediate support 14 and the powder image is transferred from belt 1 to intermediate support 14. The actuating means for moving block 32 will be described in detail later in this description.

Rollers 27 and 29 are secured to a block 33. Block 33 is so couled to block 32 mechanically that if block 32 is moved horizontally over a specific distance, block 33 is moved in the same direction over half the distance. Consequently, the distance between the exposure place 59A and roller 28, as measured along the path covered by belt 1, does not change as a result of the displacement of roller 28. Roller 27 and roller 29 are freely moveable horizontally with respect to block 33. If roller 28 is in the position of rest or the auxiliary position, however, roller 27 is locked in a predetermined position.

A displacement pick-up, in the form of a potentiometer 37, is secured to block 33. The slider of potentiometer 37 is secured to the shaft of roller 27. A spring (not shown) is also secured to the shaft of roller 27 to press roller 27 away from roller 28. Potentiometer 37 is connected to a voltage source. Upon displacement of roller 27, the slider of potentiometer 37 is driven by the shaft of roller 27 so that the voltage at the slider of potentiometer 37 changes (this slider voltage will hereinafter be denoted by VL1).

This voltage change is an indication of the displacement of roller 27 with respect to block 33. The voltage source is so connected that the voltage VL1 drops when roller 27 is moved towards roller 28. Voltage VL1 is delivered via a signal line 38 to servo-system 35. By means of voltage VL1, servo-system 35 controls the speed of roller 36 in such a way that the speed of belt 14 is kept equal to the speed of belt 1. Servo-system 35 will be described in detail later in this description.

A second displacement pick-up in the form of a potentiometer 39 is also secured to block 33. The slider of potentiometer 39 is secured to the shaft of roller 29. A spring (not shown) is also secured to the shaft of roller 29 to press roller 29 awar from roller 28. Potentiometer 39 is connected to a voltage source. Upon displacrement of roller 29 with respect to block 33, the slider of potentiometer 39 is driven by the shaft of roller 29 so that the voltage at the slider of potentiometer 39 changes (this slider voltage will hereinafter be referred to as VL2).

This voltage change is an indication of the displacement of roller 29 with respect to block 33. The voltage source is so connected that the voltage VL2 falls when roller 29 is moved towards roller 28. Voltage VL2 is delivered via a signal line 40 to servo-system 11. Servo-system 11 drives belt 1 at a speed directly proportional to voltage VL2. Servo-system 11 and potentiometer 39 together form a feedback control system which keeps roller 29 in a position of equilibrium with respect to block 33 by adjustment of the speed of belt 1.

A light source 70 is also disposed above the section of belt 1 between rollers 27 and 28 in order to reduce the adhesion of the powder image to belt 1. Disposed opposite roller 34 is a pressure roller 68 which can be pressed against intermediate support 14 by an actuating means (not shown). A sheet of paper can be fed between the rollers 34 and 68 along a paper conveying path 69 by means of a conveyor roller 48. Just past conveyor roller 48 there is disposed a stop 50 which can be raised or lowered by an actuating means (not shown). In the lowered position, any sheet of paper fed via path 69 is retained by stop 50.

A cleaning brush 72 is provided in cleaning section 4 opposite a roller 73 to remove any powder residues remaining on belt 1. Before belt 1 reached brush 72, it is exposed by a lamp 71 by means of which any charge residues on belt 1 are removed. After passing roller 73, belt 1 is fed via a roller 74 to drive section 9 and then to meander section 12. Meander section 12 consists of a number of rollers 41A to 41K and a roller 75 which is freely moveable vertically over which belt 1 is taken.

A number of detectors are provided to control the copying process. Detector 64 detects the presence of an original in entry path 52 and detector 66 disposed at a predetermined distance from slit 55 detects the presence of a passing original. Detector 67 in meander section 12 is disposed at a predetermined distance from exposure place 59A and detects a marker 43 applied on belt 1. Marker 43 is disposed at a predetermined distance from a seam 42 present in belt 1.

Figure 2:
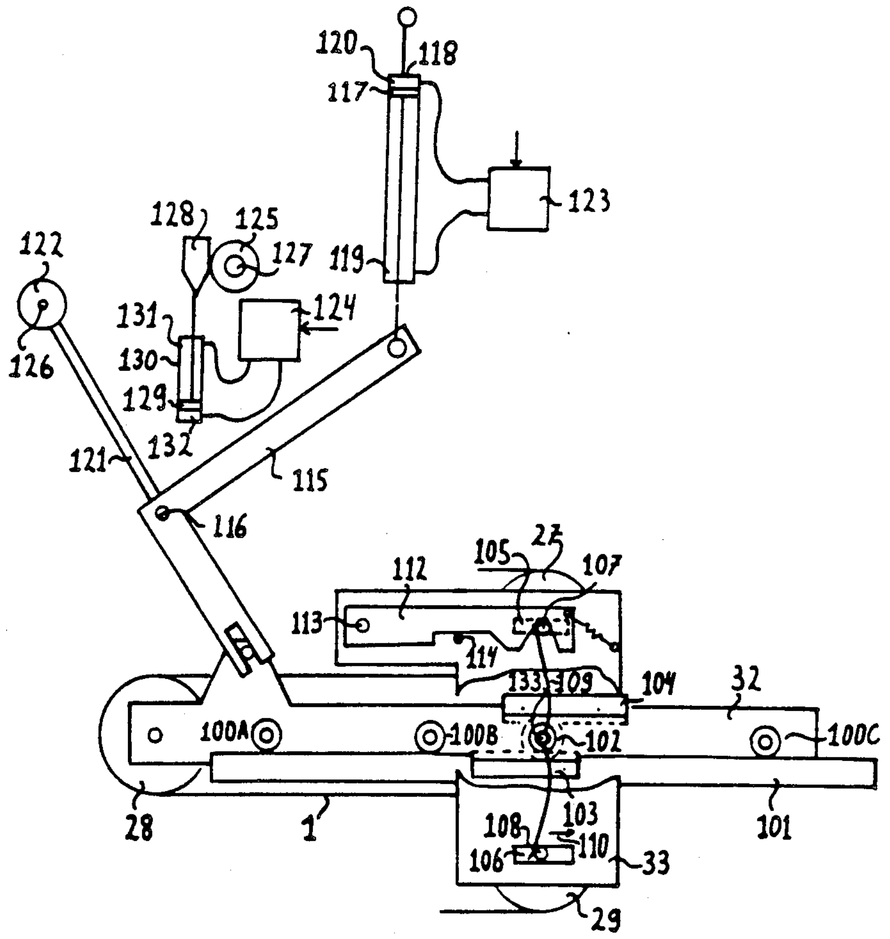
FIG. 2 is the image transfer section of the copying machine of FIG. 1.

FIG. 2 is a detailed representation of image transfer section 3. Freely rotatable rollers 100A to 100C are secured to block 32 and rest on a guide 101 secured to the frame of the copying machine so that block 32 can be displaced horizontally with little friction. A first rack 103 is secured to guide 101. A gearwheel 102, the shaft of which is mounted in block 33, engages rack 103. Gearwheel 102 also engages a second rack 104 secured to block 32. When block 32 is displaced a specific distance with respect to guide 101, gearwheel 102, and, hence, block 33 are displaced over half the distance as a result of the displacement of rack 104.

Shafts 107 and 108 of rollers 27 and 29 respectively are freely moveable horizontally in slots 105 and 106 respectively in block 33. A force is exerted in the direction of arrow 110 at each end of shafts 107 and 108 by means of a torsion spring 109. Each torsion spring 109 is freely rotatable about a shaft 133 secured to block 33 midway between the ends of shafts 107 and 108. The tension in belt 1 both before and after roller 28 is substantially identical as a result of the above set-up.

A latch 112 is secured to a shaft 113 which is mounted in block 33 so as to be freely rotatable. Latch 112 is formed with a notch by means of which shaft 107 can be set at a predetermined place with respect to block 33. A pawl 114 is secured to the frame of the copying machine and cooperates with an inclined portion of latch 112. When block 33 is moved to the left, pawl 114 presses against the inclined portion so that latch 112 is pressed up. Shaft 107 is, thus, unlocked so that it becomes freely moveable in slot 105.

A toggle lever 115 is pivotable about a shaft 116 secured to the frame of the copying machine. One side of toggle lever 115 is coupled to block 32. The other side of toggle lever 115 is connected via a rod to a piston 117 which is freely moveable in a cylinder 118. The end of cylinder 118 is secured to the frame of the copying machine. Either bottom part 119 or top part 120 of cylinder 118 can be pressurized by means of electrically controllable actuating means 123.

A rod 121 is also connected to lever 115. A shaft 126 about which a roller 122 is freely rotatable is secured to the end of rod 121. To one side of roller 122 is a roller 125 freely rotatable about a shaft 127 secured to the frame of the copying machine. A wedge 128 is located between rollers 122 and 125 and rests against roller 125 on one sid. A piston 129 is secured to wedge 128 and cooperates with a cylinder 130 secured to the frame of the copying machine. Either top part 131 or bottom part 132 of cylinder 130 can be pressurized by means of an electrically controllable actuating means 124.

Actuating means 123 and 124 have pressurized cylinder bottom part 119 and cylinder top part 131 respectively in the position shown in FIG. 2. In this situation, roller 28 is in the position of rest. As soon as pressure is applied to cylinder top part 120 by actuating means 123, piston 117 is pressed out of cylinder 118 so that the pivoting of toggle lever 115 causes block 32 and, hence, also block 33 to be displaced to the left with respect to the position shown in FIG. 2. When roller 122 driven by lever 115 and rod 121 reaches wedge 128, any further pivoting of toggle lever 115 is counteracted.

Roller 28 secured to block 32 is then in the auxiliary position. In this position, block 32 has not yet been moved to the left to such an extend that latch 112 is pressed up by pawl 114 so that roller 27 remains locked. When cylinder bottom part 132 is pressurized, wedge 128 is raised by piston 129. As a result, roller 122 is no longer retained by wedge 128 so that toggle lever 115 is pivoted by the pressure in cylinder top part 120 further in the clockwise direction until roller 28 is pressed by block 32 against intermediate support 14. Roller 28 is then in the transfer position. Under these conditions, block 33 is displaced to such an extent that pawl 114 presses up latch 112 so that shaft 107 becomes freely moveable in slot 105.

B. The Belt Drive

In the copying machine described above, the path covered by belt 1 is divided into three sections. In each section, belt 1 is advanced by a separate drive system. These sections of belt 1 are: (1) the section between roller 16 and drive roller 7 in which belt 1 is advanced by synchronous motor 8; (2) the section between roller 26 and drive roller 10 in which belt 1 is advanced by servo-system 11; and (3) the section between roller 41A and drive roller 47 in which belt 1 is driven by servo-system 15.

The tension in belt 1 in the section between roller 16 and drive roller 7 is determined by the force with which roller 16 is pressed down. In the preferred embodiment described here, roller 16 is a roller moving freely in the vertical direction. Thus, the belt tension in this section except for a small deviation due to friction is determined by the weight of roller 16. Similarly, the tension of belt 1 in meander section 12 is determined by the weight of roller 75 which is freely moveable in the vertical direction.

If belt 1 is not in contact with belt 14 and if roller 27 is locked, the tension of belt 1 in the section between roller 26 and drive roller 10 is determined by the force with which the ends of torsion springs 109 press against the end of shaft 108 of roller 29.

If roller 28 has been brought to the transfer position so that belt 1 is pressed against belt 14 and roller 27 is unlocked, the belt tension in the section between roller 28 and roller 10 is still determined by the force with which torsion springs 109 press against shaft 108 of roller 29. In that case, however, the belt tension in the section between roller 26 and roller 28 is determined by the force with which torsion springs 109 press against shaft 107 of roller 27.

Since torsion springs 109 are disposed freely rotatable in the middle between slots 105 and 106, the belt tension both before and after roller 28 is substantially identical when in the transfer position. One of the results of this is that the frictional force required to advance belt 1 and exerted thereon by belt 14 at the transfer zone is very low so that the wear on the belts is low and any vibrations in belt 1 at the transfer zone which would have an adverse effect on the quality of the transferred image are avoided.

As a result of the above steps, the belt tensions in the separate sections are independent of one another. It is, thus, possible to select the optimum belt tension for each section. Also, vibrations in the belt in one section have little or no effect on the other sections. This is important particularly in respect to the image-forming section 2 where belt 1 has to be advanced at a very uniform speed at exposure place 59A since speed variations (due to vibrations) result in an unsharp copy.

The average speed in the sections between roller 26 and roller 47 is made equal to the speed of belt 1 in the image-forming section by means of servo-systems 11 and 15. Servo-system 15 controls the speed of belt 1 at roller 16 in such a manner that roller 16 is held in a predetermined position. This means that belt 1 is taken to roller 16 by servo-system 15 at a speed equal to the speed with which belt 1 is moved by motor 8. Similarly, servo-system 11 keeps the speed at which belt 1 is taken away from roller 29 equal to the speed at which belt 1 is taken to roller 29.

C. The Forming of the Image

Copies of an original fed past exposure slit 55 can be made by means of the above-described copying machine. To form one copy, a powder image is formed on belt 1 by successively charging, exposing and applying powder to belt 1. When the powder image approaches roller 28, the latter is brought into the transfer position so that belt 1 is pressed against belt 14. When the powder image passes through the pressure zone between rollers 28 and 36, it is transferred to belt 14. The transferred powder image is heated while it is driven by intermediate support 14. In these conditions the powder particles soften so that the image has become tacky when it approaches roller 34.

In the meantime, a cutting means (not shown) has cut a sheet of paper to the length of the powder image from a reel. The length of the sheet is derived from the length of the original which is in turn determined in path 54. The cut-off sheet is taken along path 69 where it is retained by stop 50. As soon as the softened powder image approaches roller 34, stop 50 is raised so that the sheet of paper lying in readiness is fed between rollers 34 and 68. Also, roller 68 is pressed against belt 14. When the sheet and the powder image on belt 14 subsequently pass through the pressure zone between rollers 34 and 68, the softened (and tacky) image material is pressed into the paper. After cooling, the image will be firmly bonded to the paper and, thus, fixed.

D. The Control of the Copying Machine

The actuating means for displacing rollers 28 and 68, for raising and lowering stop 50 and for switching the corona device on and off are controlled by a control device 150 which will be described in detail hereinafter with reference to FIG. 3. The times at which rollers 28 and 68 have to be displaced, stop 50 has to be raised or lowered and the corona device has to be switched on or off are related to the location of the copy under formation on belt 1 or belt 14. These times will hereinafter be referred to as action times, and the operation required to be carried out at a time will hereinafter be referred to as an action.

In order to determine these action times, the control system for each copy under formation registrates the positions of the leading edge and the trailing edge of that part of belt 1 or belt 14 on which a copy is being formed. These parts will hereinafter be termed imaging sections. As soon as the leading or trailing edge of an imaging section reaches a location at which an action is required to be carried out (hereinafter referred to as the action location), the control system will deliver the necessary signals to the actuating means or actuating circuits so that the action is carried out through the agency of said means or circuits.

For example, by means of control device 150: (a) corona device 23 is switched on when the leading edge of an imaging section reaches location V1 (see FIG. 1), (b) corona device 23 is switched off when the trailing edge of an imaging section reaches location B1, (c) the light intensity of lamps 56 is adjusted as soon as the leading edge of an imaging section reaches location V3, (d) roller 28 is brought into the transfer position as soon as the leading edge of an imaging section reaches location V4, (e) roller 28 is brought into the auxiliary position as soon as the trailing edge of an imaging section reaches location B3, (f) stop 50 is raised as soon as the leading edge of an imaging section reaches location V5, (g) stop 50 is lowered again as soon as the trailing edge of an imaging section reaches location B4, (h) roller 68 is pressed against belt 14 as soon as the leading edge of an imaging section reaches location V6, (i) roller 68 is lowered again as soon as the trailing edge of an imaging section passes location B5. Before an image is formed, a check is made to determine whether seam 42 comes within the imaging section intended for the formation of the image. The way in which this is determined will be described in detail hereinafter.

If seam 42 comes within an imaging section, a so-called dummy copy is formed. Upon forming a dummy copy, the imaging section, after being charged, is immediately discharged by a lamp 51 (see FIG. 1) which is disposed between corona device 23 and exposure place 59A along the path traversed by the belt 1. Also, upon forming of a dummy copy, stop 50 is not raised so that no sheet of paper is fed between rollers 34 and 68. Upon forming a dummy copy, lamp 51 is switched on at the time that the leading edge of the imaging section reaches location V2 and is switched off at the time that the trailing edge reaches location B2.

Hereinafter, control device 150 will be described in detail with reference to FIG. 3, and the way in which the copying process is controlled will be described in detail with reference to FIGS. 4 to 13.

Figure 3:
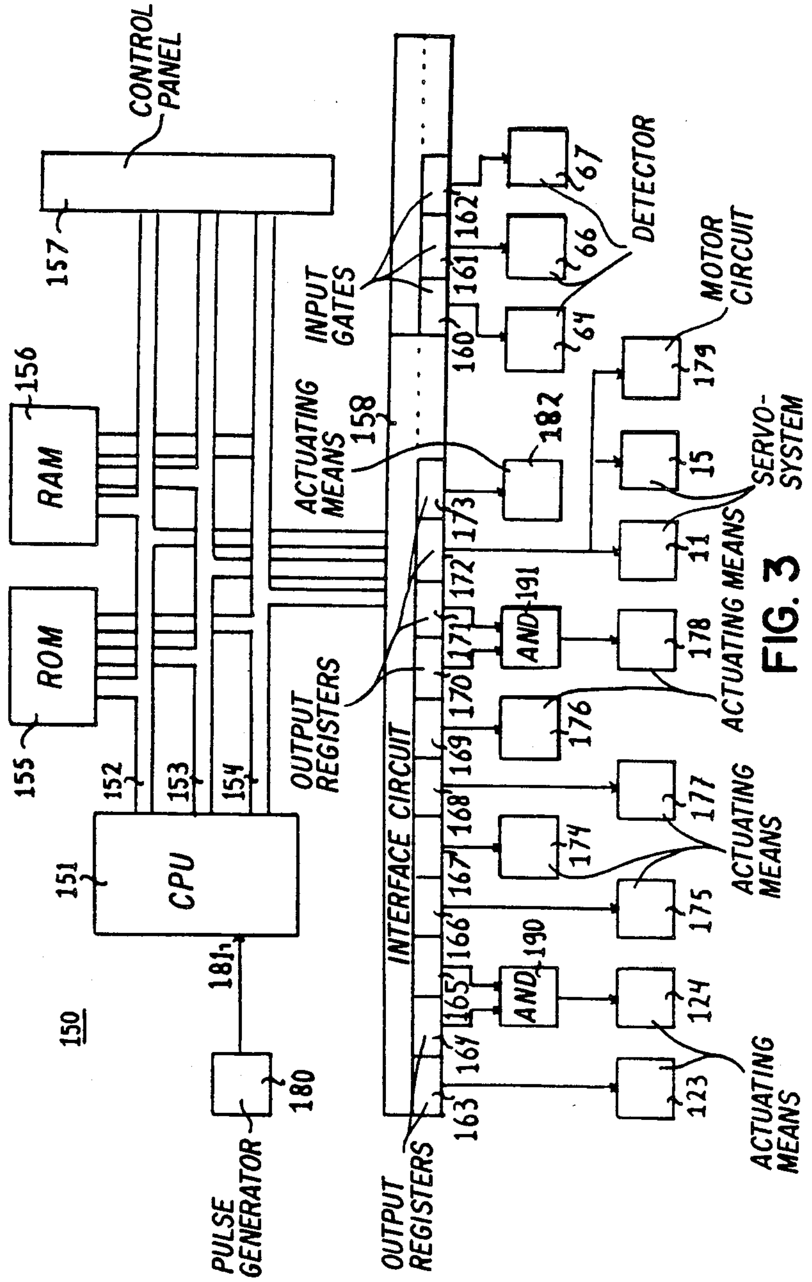
FIG. 3 is a control device for controlling the copying machine of FIG. 1.

In FIG. 3, reference 151 denotes a conventional type central processing unit (CPU). Central processing unit 151 is connected via a data bus 152, an address bus 153 and a control bus 154 to a read-only memory (ROM) 155, a random access memory (RAM) 156, a control panel 157 for inputting and displaying the input data for a required copying order and an interface circuit 158. Interface circuit 158 comprises a number of input gates 160, 161 and 162 and a number of output registers 163 to 173. Via address bus 153, central processing unit 151 can select one of the input gates 160, 161 or 162 or one of the output registers 163 to 173. Via data bus 152, central processing unit 151 can read the input signals of the selected input gate or load a selected output register. The loading or reading process is controlled by central processing unit 151 via control bus 154. The inputs of input gates 160, 161 and 162 are connected to detectors 64, 66 and 67 respectively.

The outputs of output registers 163, 166, 167, 168, 169 and 173 are connected to the control inputs of actuating means 123, an actuating means 175 for raising stop 50, an actuating means 174 for raising roller 68, an actuating means 177 for switching lamp 51 on and off, an actuating means 176 for raising stop 49 and an actuating means 182 for actuating switch 61, respectively.

The output of output register 172 is connected to the control inputs for switching servo-systems 11 and 15 on and off and an actuating circuit 179 for switching synchronous motor 8 on and off. The outputs of output registers 164 and 165 are connected to a two-input AND gate 190. The output of AND gate 190 is connected to the input of actuating means 124 for bringing roller 28 into the transfer position. Roller 28 is held in the transfer position when the output signal of AND gate 190 is a 1, i.e. when both output register 164 and output register 165 are loaded with a 1.

The outputs of output registers 170 and 171 are connected to a two-input AND gate 191. The output of AND gate 191 is connected to the input of an actuating circuit 178 for switching corona device 23 on and off. Corona device 23 is switched on when the output signal of AND gate 191 is a 1, i.e. when both output register 170 and output register 171 are loaded with a 1.

A pulse generator 180 is connected to the program interrupt input 181 of central processing unit 151. Pulse generator 180 delivers pulses P at a frequency proportional to the speed of belt 1 so that a period of the pulse signal corresponds to a constant displacement of belt 1.

Figure 4:
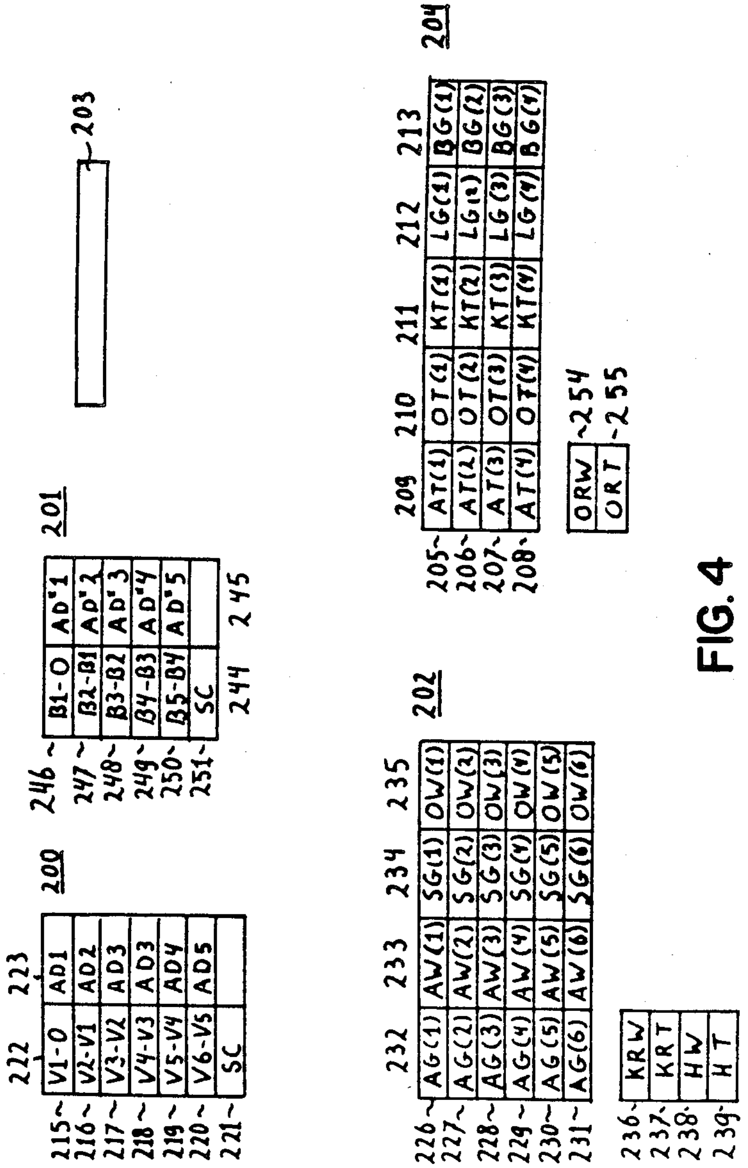
FIG. 4 shows a number of tables used for controlling the copying machine of FIG. 1.

In order to control the copying process, central processing unit 151 carries out a program stored in read-only memory 155. Depending upon the copying order input via control panel 157, the signals delivered by detectors 64, 66 and 67, and the stages of the various copies under formation, central processing unit 151 switches the means and devices required to form the copy on or off. For the purpose of performing each action, depending on whether it is a switching-on or switching-off action, the program initiates a switch-on action routine or a switch-off action routine. During the performance of a switch-on action routine or a switch-off action routine, the output register in question is loaded with a 1 or a 0 respectively. To determine the action times, central processing unit 151 uses a leading edge action table 200, a trailing edge action table 201 and a copy table 202 as shown in FIG. 4. Central processing unit 151 also uses a seam position register 203 for registering the position of seam 42 and an order table 204 for storing the data of the copy orders in progress which are also shown in FIG. 4.

Seam position register 203 consists of a memory location in random access memory 156. Seam position register 203 contains a number which indicates the distance between marker 43 and detector 67. This distance is expressed as a number of periods of pulses P.

Order table 204 consists of a number of memory locations with consecutive addresses in random access memory 156. Order table 204 is used for storing the data of copying orders. A copying order typically involves making a set number of copies of an original with a set exposure intensity. Order table 204 is divided into a number of rows 205 and 208 and a number of columns 209 to 213. Each row can be used to store the data of one copying order, such as (1) the required number of copies (column 209), (2) the number of times that the original still has to be taken past exposure slit 55 (column 210), (3) the number of copies still to be finished (column 211), (4) the length of the copies to be made (column 212), and (5) the exposure intensity (column 213). Hereinafter, the memory locations in columns 209, 210, 211, 212 and 213 will respectively be termed AT, OT, KT, LG and BG.

Order table 204 also comprises an order row pointer (ORW) denoted by reference 254 and an order row counter (ORT) denoted by reference 255. ORW 254 points to the row containing the data of the latest copy order. The AT, OT, KT, LG, BG pointed to be ORW 254 will hereinafter be respectively designated AT-(ORW), OT(ORW), KT(ORW), LG(ORW) and BG(ORW). ORT 255 points to the number of orders for which copies are still being formed. ORT 255 is increased by 1 when the data of a new copying order to be executed is input into order table 204, and ORT 255 is reduced by 1 when all the copies of a copying order have been finished.

When a new copying order is introduced, the contents of ORW 254 are first increased by 1 and then the data of the new copying order is stored in the row pointed to by the adjusted ORW 254. If, however, before the increase, ORW 254 points to the last row 208 of order table 204, the data of the new copying order is stored in the first row 205 and ORW 254 is so adjusted that it points to the first row after the adjustment. The order table obtained in this manner always contains the data for those copying orders for which copies are under formation.

Leading edge action table 200 consists of a number of memory locations with consecutive addresses in read-only memory 155. The table is divided into a number of rows 215 to 221 and two columns 222 and 223. In leading edge action table 200, the distances between, respectively, the locations V1 and V2, V2 and V3, V3 and V4, V4 and V5 and V5 and V6 are fixed in column 222 in the rows 216, 217, 218, 219 and 220. The distance between location V1 and a location 0 situated at a distance from exposure place 59A corresponding to the distance covered by belt 1 during the interval of time when the leading edge of an original covers the distance between detector 66 and slit 55 is also fixed in column 222 in row 215. The above distances are expressed as a number of periods of pulses P.

Stored in column 223, in rows 215, 216, 217, 218, 219 and 220, are the initial addresses of the action routines for performing the actions associated with the locations V1, V2, V3, V4, V5 and V6, respectively, which are related to the position of the leading edge of an imaging section. In column 222, row 221 is stored a stop code SC indicating the end of leading edge action table 200.

Similarly, the distances between the locations 0 and B1, B1 and B2, B2 and B3 and B4, and B4 and B5 are fixed in the trailing edge action table 201 in column 244, in rows 246, 247, 248, 249 and 250, respectively. Stored in column 245, rows 246, 247, 248, 249 and 250, are the initial addresses of the action routines for performing the actions associated respectively with the locations B1, B2, B3, B4 and B5, which are related to the position of the trailing edge of an imaging section. In column 244, row 251, stop code SC indicates the end of the trailing edge action table.

Copy table 202 consists of a number of memory locations with consecutive addresses in random access memory 156. Copy table 202 is divided into a number of rows 226 to 231 and a number of columns 232 to 235. In copy table 202, the position of the leading and the trailing edge of the associated imaging section is kept for each copy under formation.

Each row in copy table 202 can be used to indicate the position to one leading edge or the position of one trailing edge. By means of the so-called leading edge/trailing edge bit (hereinafter referred to as VAB), it is indicated in the memory location of a row in column 234 (hereinafter referred to as SG), whether the position of a leading or trailing edge is stored in the associated row.

A row from actiont able 200 or 201 as indicated by VAB is indicated in the memory location in column 233 (hereinafter referred to as AW). The memory location in Column 232 (hereinafter referred to as AG) stores a number which indicates the distance that the associated edge of an imaging section still has to cover before calling on the action routine of which the initial address is stored in the row of the proper action table (as indicated by VAB) pointed to by AW. These distances are expressed as a number of periods of pulses P. Copy table 202 is updated after each pulse P. The manner in which this takes place will be described hereinafter.

A row from order table 204 is pointed to by each memory location in column 235 (hereinafter referred to as OW). Copy table 202 also contains a copy table row pointer (KRW) indicated by 236, a copy table row counter (KRT) indicated by 237, an auxiliary pointer (HW) indicated by 238 and an auxiliary counter (HT) indicated by 239. The most recently referenced row copy table 202 is pointed to by KRW 236. The AG, AW, SG and OW pointed to by KRW 236 are hereinafter referred to respectively as AG(KRW), AW(KRW), SG(KRW) and OW(KRW).

KRT 237 indicates the number of rows in copy table 202 which are in use. For each copy required to be formed, two rows are utilized in copy table 202. The position of the leading edge of the imaging section is registered in one row, and the position of the trailing edge of the imaging section is registered in the other row.

When a row is utilized, the contents of KRW 236 are first increased by 1 and then the row indicated by the adjusted KRW 236 is filled with the necessary data. If, however, KRW 236 points to the last row before the increase is made, the first row 226 will be used and KRW 236 will be adjusted so that the first row 226 is the indicated row after the adjustment.

Also, each time a row is utilized, KRT 237 is increased by 1. KRT 237 is reduced by 1 if the leading or trailing edge passes location V6 or B5 respectively. The way in which this is performed will be described in detail hereinafter.

In addition to register 203 and the above-mentioned tables—200, 201, 202 and 204—there are a number of memory locations in random access memory 156 (hereinafter referred to as the input memory) which are used to store data for the last copy order input via control panel 157 but not yet started. For the enbodiment described herein, the particular input data is the number of copies to be made and the required exposure intensity.

The way in which order table 204, copy table 202 and seam position register 203 are updated, and the way in which the action times are determined, will be described in detail hereinafter with reference to the flow diagrams represented in FIG. 5 through FIG. 13.

Figure 5:
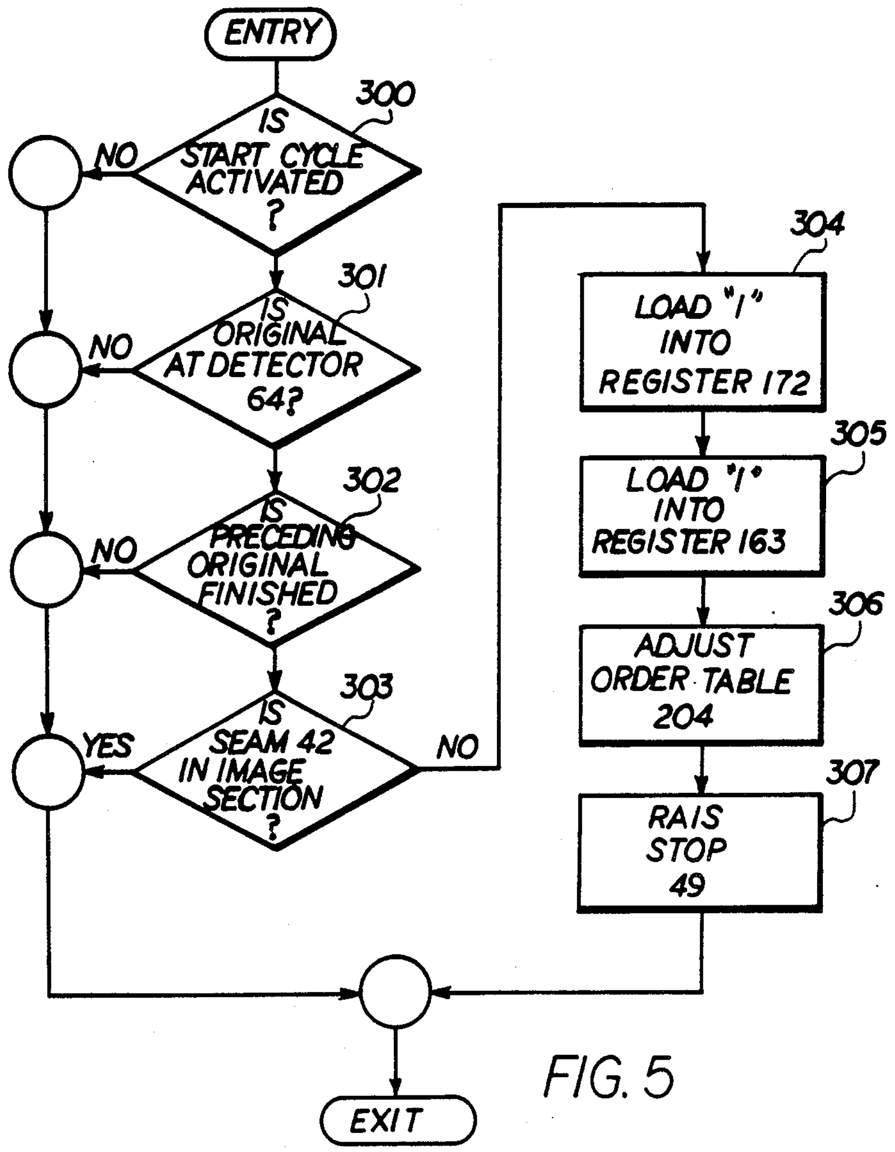

FIG. 5 represents the flow diagram of the feeding routine for controlling the feeding of an original in endless path 54. The original feeding routine is carried out by central processing unit 151 at regular intervals (e.g. every 100 milliseconds). After the CPU calls the routine, it first makes a test during the performance of step 300 to check whether the start button has been pressed. If the start button has not been pressed, the original feeding routine is abandoned.

If it has been pressed, a test is made during the performance of step 301 using the detection signal from detector 64 to check whether an original is present at detector 64. If not, the original feeding routine is abandoned. If an original is present, a test is carried out during the pereformance of step 302 to check whether the preceding original has been taken past exposure slit 55 the requisite number of times. For this purpose, the contents of the OT(ORW) are used in which there is an indication of how many times the original of the preceding copy order is still required to be taken past slit 55. If the contents of OT(ORW) are not equal to 0, the original feeding routine is abandoned. If the contents of the associated original counter are 0, step 303 is carried out.

During the performance of step 303, a test is made to check whether there is a possibility that if the original in readiness is introduced into path 54, seam 42 will be situated within an imaging section. For the purpose of this test, the distance between seam 42 on belt 1 and a predetermined location A along the path traversed by belt 1 (see FIG. 1) is determined from the distance between marker 43 and detector 67, the distance between detector 67 and exposure place 59A, the distance between marker 43 and seam 42 and the distance between the exposure place 59A and location A.

The distance between marker 43 and detector 67 is registered in seam position register 203. The distance is expressed as a number of periods of pulses P. The other three distances are stored in read-only memory 155 and are also expressed as numbers of periods of pulses P. The distance between location A and exposures place 59A is equal to the distance traversed by belt 1 when the leading edge of the original covers the distance between stop 49 and exposure slit 55. If the distance between seam 42 and location A is less than the length of the copy to be formed, then if the original is introduced into endless path 54, seam 42 will come within an imaging section on which the copy will be formed.

The length of the copy to be formed, however, is dependent upon the length of the original. The length of the original is still unknown at the time when the original is introduced. What is known, however, is that the original length may not exceed a specific maximum length which is determined by the length of endless path 54. Thus, if the determined distance between seam 42 and location A is less than the copy length corresponding to the maximum original length, the original feeding routine is again abandoned.

If the determined distance is greater than the distance between seam 42 and location A, steps 304, 305, 306 and 307 are carried out successively before the original routine is abandoned. During the performance of step 304, output register 172 is loaded with a 1. If output register 172 had not yet been loaded with a 1, doing so would switch on servo-systems 11 and 15 and synchronous motor 8 to advance belt 1. If output register 172 had previously been loaded with a 1, belt 1 already would have been driven by servo-systems 11 and 15 and synchronous motor 8. In that case, there is no change in the drive of belt 1 as a result of loading register 172.

During the performance of step 305, output register 163 is loaded with a 1. If output register 163 had not yet been loaded with a 1, roller 28 had not yet been brought into the auxiliary position through the agency of actuating means 123, piston 117 and cylinder 118. By loading output register 163 with a 1, roller 28 is brought into the auxiliary position. If output register 163 already has been loaded with a 1, roller 28 already has been brought into the auxiliary position. In that case, roller 28 does not change its position as a result of the loading of register 163.

During the performance of step 306, order table 204 is adjusted. Initially, the contents of ORW 254 are increased by 1 so that after adjustment the pointer points to the next unused row in order table 204. If, however, before the adjustment ORW 254 points to the last row, ORW 254 is so adjusted that after adjustment it points to the first row 205 in order table 204. ORT 255 is then increased by 1 during step 306. The number of copies to be made and the required exposure intensity are then called from the input memory. The number of copies to be made is stored in AT(ORW), OT(ORW) and KT(ORW). The required exposure intensity is stored in BG(ORW). LG(ORW) is loaded with 0.

Figure 6:
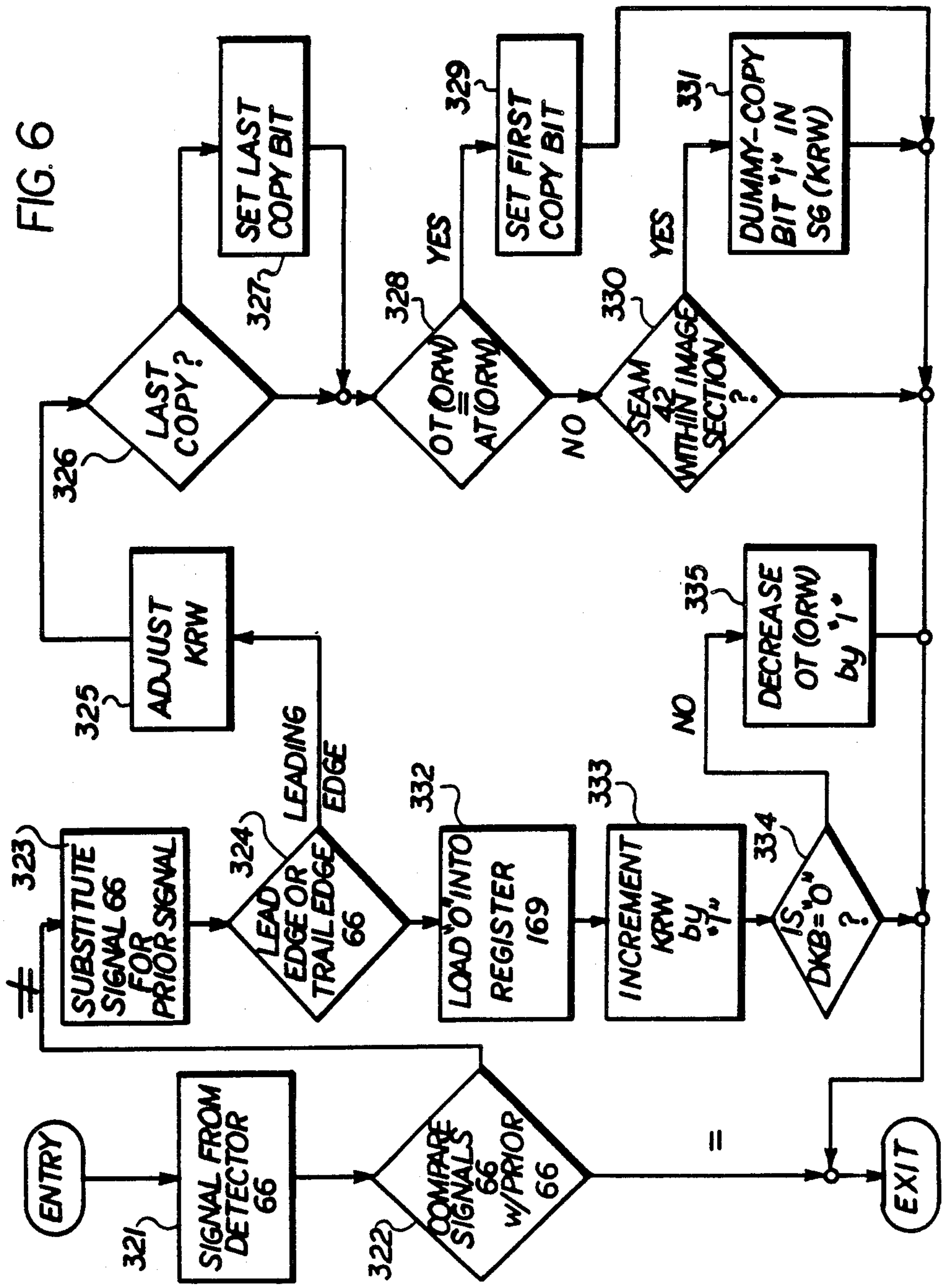

FIG. 6 represents the flow diagram of the copy table filling routine. This routine is called up by central processing unit 151 at short intervals (e.g. every 10 milliseconds). The copy table filling routine consists of a number of steps, 321 to 335. Steps 321 to 324 determine whether the leading or the trailing edge of the original has passed detector 66 between two different calls of the copy table filling routine by central processing unit 151.

During the performance of step 321, the detection signal of detector 66 is read by central processing unit 151 via input gate 161. The read value is stored in a memory location having a predetermined address in memory 156. This memory location will hereinafter be referred to as "new 66."

During the performance of step 322, the contents of "new 66" are compared with the detection signal which is determined during the previous call of the copy table filling routine by the central processing unit 151. This previous detection signal is stored in a memory location having a predetermined address in memory 156. This memory location will hereinafter be referred to as "old 66." If the contents of "old 66" correspond to the contents of "new 66," the copy table filling routine is abandoned.

If the contents of "old 66" and "new 66" do not correspond to one another, then "old 66" is loaded with the contents of "new 66" during the performance of step 323. On the basis of the contents of "new 66," a check is made during the performance of step 324 to determine whether the leading edge or the trailing edge of the original has passed detector 66. If the contents of "new 66" indicate that detector 66 is actuated by the original, the leading edge of the original has passed detector 66 in the interval of time between the penultimate and last call of the copy table filling routine by the central processing unit 151. In that case, step 325 is carried out after step 324. If the contents of "new 66" indicate that detector 66 is not actuated by an original, then the trailing edge of the original has passed detector 66 in the interval of time between the penultimate and last call of the copy table filling routine by the central processing unit 151. In that case, step 324 is followed by step 332.

During the performance of step 325, the contents KRW 236 are increased by 1 so that now KRW 236 points to the next unused row in copy table 202. However, if before the adjustment, KRW 236 points to the last row (231) from table 202, KRW 236 is so adjusted that after adjustment it points to the first row (226) from copy table 202. AW(KRW) is then loaded in step 325 with the number stored in the first row 215, column 222 of leading edge action table 200. This number indicates the distance between 0 and V1. KRT 237 is also increased by 1. AW(KRW) is so adjusted that after the adjustment AW(KRW) indicates the first row (215) of leading edge action table 200. OW(KRW) is made equal to ORW 254, which indicates the order for which the copy is to be made. The VAB in SG(KRW) is loaded with a 1. The other bits in SG(KRW) are loaded with 0. The position of the leading edge of a new imaging section is, thus, fixed in copy table 202 by the above-described changes made during the performance of step 324 after the leading edge of an original has been detected by dectector 66.

During the performance of step 326, a test is then carried out to check whether the copy to be formed is the last copy of the order. During this test, the contents of OT(ORW) are called up. If the contents of OT(ORW) are equal to 1, this means that the original will be taken for the last time past exposure slit 55. In that case, the copy to be formed is the last of an order and then during the performance of step 327 the bit indicating that it relates to the last copy of an order is loaded with 1. This bit will hereinafter be referred to as LKB. After the loading of LKB, the routine is followed by the performance of step 328. If, during performance of step 327, it is found that OT(ORW) is not equal to 1, step 326 is immediately followed by step 328.

During the performance of step 328, a test is carried out to check whether OT(ORW) corresponds to AT(ORW). If OT(ORW) and AT(ORW) correspond to one another, the copy to be formed is the first of a copying order. In that case, during the performance of step 329, the bit is loaded with a 1 in the status memory indicating that this relates to the first copy of the order, and then the copy table filling routine is abandoned. This bit wil hereinafter be referred to as EKB.

If, however, OT(ORW) and AT(ORW) do not correspond to one another, step 330 is carried out. During the performance of step 330, a check is made to test whether seam 42 comes within the imaging section designated from the position of the leading edge which was determined during step 325. For the purpose of this test, the distance between seam 42 and a predetermined location C (see FIG. 1) along the path traversed by the belt 1 is determined from the distance between marker 43 and detector 67, the distance between detector 67 and exposure place 59A, the distance between marker 43 and seam 42 and the distance between the exposure place 59A and the location C.

The distance between marker 43 and detector 67 is registered in seam position register 203. This distance is expressed as a number of periods of pulses P. The other three distances are stored in read-only memory 155 and are also expressed as periods of pulses P. Central processing unit 151 conventionally calculates the distance between seam 42 and location C from the distances stored in memory and the contents of seam position register 203. The distance between location C and exposure place 59A is equal to the distance covered by belt 1 when the leading edge of an original bridges the distance between dectector 66 and exposure slit 55.

The determined distance between location C and seam 42 is compared with the length of the copy to be formed. This length is stored in LG(ORW). If the determined distance is less than the copy length, seam 42 is situated within the new imaging section. In that case, the so-called dummy-copy-bit is set by loading a 1 in SG(KRW) during the performance of step 331. The dummy-copy-bit is hereinafter referred to as DKB. The copy table filling routine is then abandoned.

If during the performance of step 324 it is found that detector 66 is not actuated, this means that the trailing edge of the original has passed detector 66 during the interval of time between the last and the penultimate call of the copy table filling routine. In that case, step 324 is followed by the steps 332, 333 and 334. During the performance of step 332, output register 169 is loaded with a 0, which results in stop 49 being lowered by actuating means 176 if stop 49 has not yet been lowered.

During the performance of step 33, KRW 236 is increased by 1 so that KRW 236 indicates the next unused row in copy table 202. If, however, before the increase KRW 236 pointed to the last row (231) in copy table 202, KRW 236 is so adjusted that after adjustment the first row (226) of copy table 202 is pointed to. AG(KRW) is then loaded with the number stored in the first row 246, column 244 of trailing edge action table 201. This number indicates the distance between the locations B1 and 0. AW(KRW) is so adjusted that AW(KRW) after the adjustment points to the first row (246) in the trailing edge action table 201. SG(KRW) is loaded with the SG contents of the preceding row in the copy table. VAB in SG(KRW) is then made 0, thus, indicating that the position in question relates to the trailing edge. The position of the trailing edge of a new imaging section is, thus, fixed in copy table 202 by the above-described changes made during the performance of step 333, after the trailing edge of an original has passed detector 66.

Step 333 is followed by step 334 in which a test is carried out to check whether DKB in SG(KRW) is 1. If so, the copy table filling routine is abondoned. If not, OT(ORW) is reduced by 1 and the copy table filling routine is abondoned. If the original counter becomes 0, switch 61 is so actuated by means of a routine (not described) that the original will leave path 54 via switch 61.

Figure 7A:
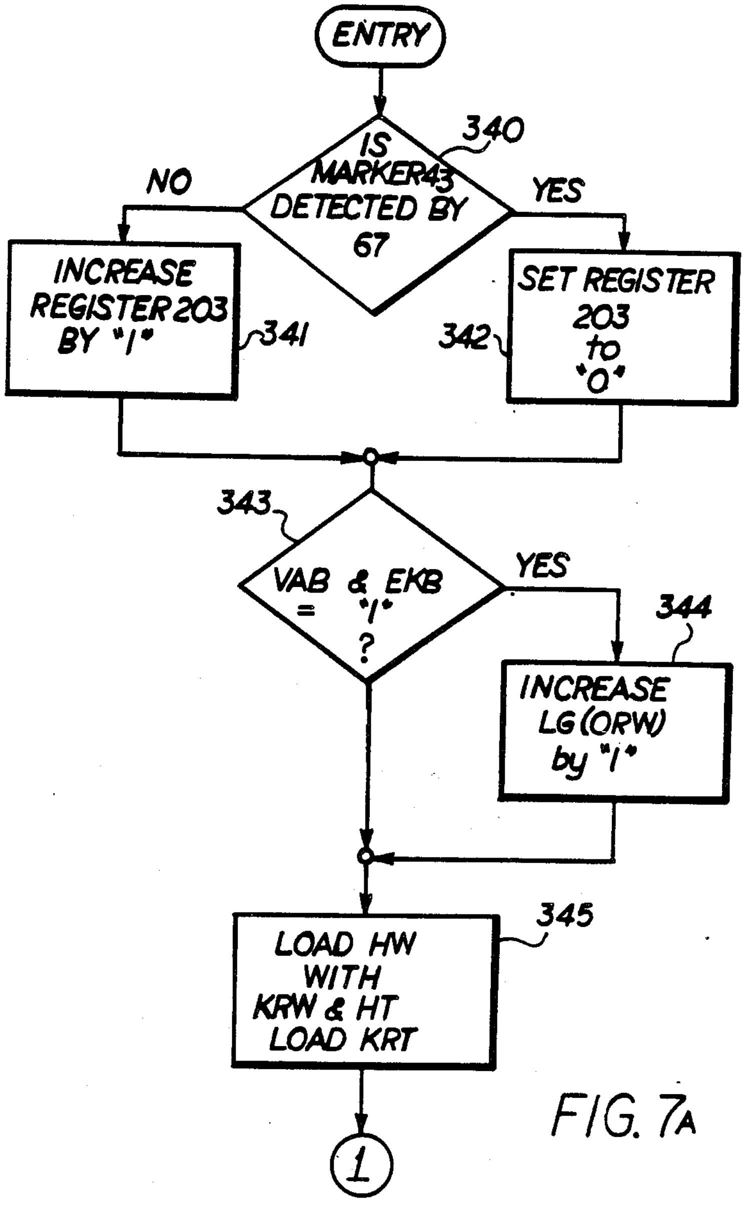
FIGS. 7A and 7B are the flow diagrams for the copy table updating routine.
Figure 7B:
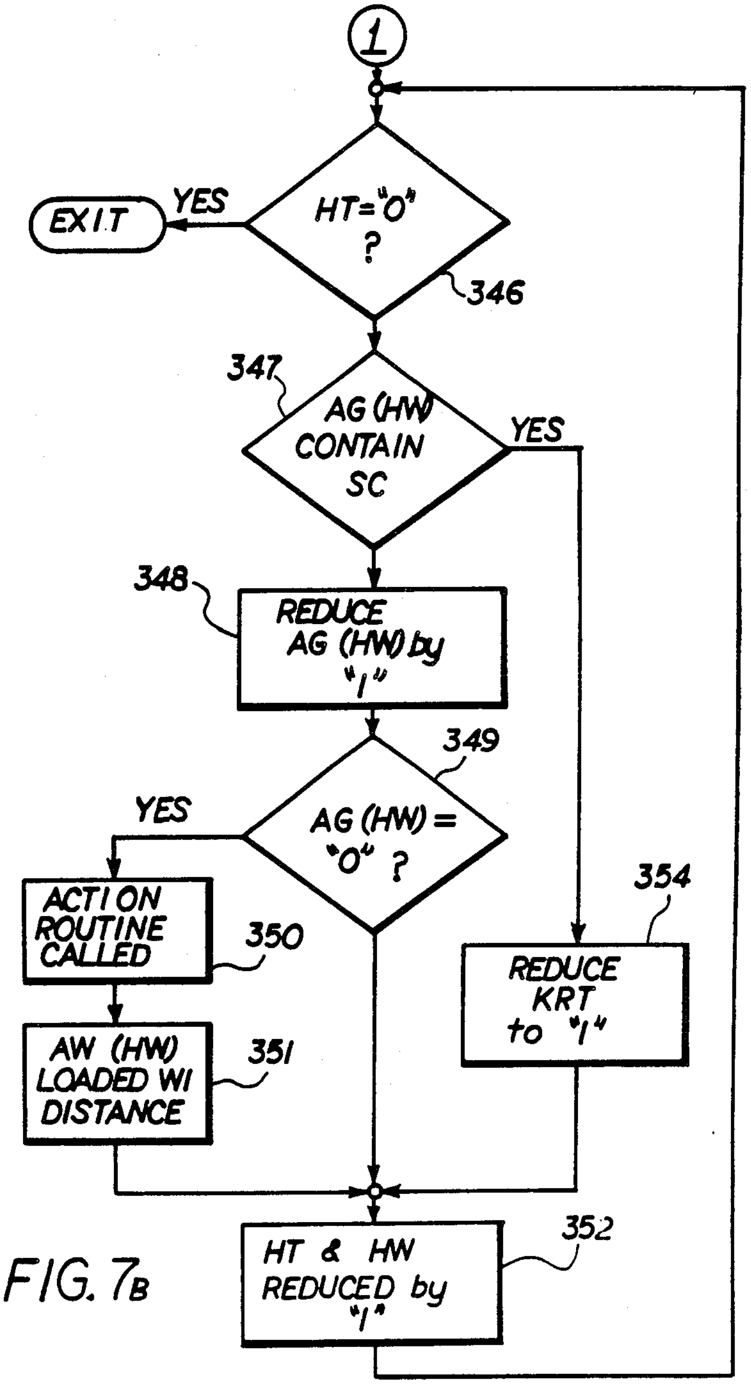

FIGS. 7A and 7B represent the flow diagram of a routine for updating copy table 202. This routine will hereinafter be referred to as the copy table updating routine. The copy table updating routine is called whenever pulse generator 180 delivers a pulse on program interrupt input 181 of central processing unit 151.

After calling the routine, the contents of seam position register 203 are updated by means of the steps 340, 341 and 342. During the performance of step 340, a test is carried out to check whether marker 43 on belt 1 is detected by detector 67. If so, the contents of seam position register 203 are set to 0 during the performance of step 342. If not, the contents of seam position register 203 are increased by 1 during performance of step 341.

After updating seam position register 203, the length of the first copy of a copy order is determined by means of the steps 343 and 344. During the performacne of step 343, a test is made to check whether both VAB and EKB in SG(KRW) are 1. If at least one of these two bits is 0, step 343 is followed by step 345. If both bits are equal to 1, the contents LG(ORW) are increased by 1 during the performance of step 344 before step 345 is carried out.

Step 345 is the first step of the part of the copy table updating routine in which the data from copy table 202 pointing to the positions of the leading and trailing edges of the imaging sections are updated and in which a test is carried out to check whether the leading edge or the tailing edge has reached one of the locations V1 to V6 or B1 to B5 respectively. During the performance of step 345, HW 328 is loaded with the contents of KRW 236 and HT 239 is loaded with the contents of the KRT 237.

During the performance of step 346, a test is then carried out to check whether the contents of HT 239 are equal to 0. If not, a test is carried out during the performance of step 347 to check whether AG(HW) contains the stop code SC. If it does, KRT 237, which indicates the number of used rows in the copy table, is reduced to 1 during the performance of step 354. In this way the row in copy table 202 containing the stop code SC is released. Step 354 is followed by step 352.

If, during the test in step 347, it is found that the distance memory pointed to by HW 238 does not contain a stop code SC, the contents of AG(HW) are reduced by 1 during the performance of step 348 and a test is then carried out during the performance of step 349 to check whether the contents of AG(HW) have become 0 after reduction. If not, step 349 is followed by step 352. If the contents have become 0, steps 350 and 351 are carried out before proceeding with step 352.

During the performance of step 350, an action routine is called on. The initial address of the action routine is stored in one of the action tables. VAB SG(HW) indicates the action table in which the initial address is stored. AW(HW) indicates the row of the indicated action table in which the initial address is stored. After the performance of the called action routine, AW(HW) is first increased by 1 so that after the increase AW(HW) points to the next row in the action table. The contents of the memory location in the first column of this row in the action table, which contents indicate the distance to the next action location, is called up and then loaded in AG(HW).

The copy table updating routine then continues with step 352, in which the contents of both HT 239 and HW 238 are reduced by 1. If, however, before the increase, HW 238 points to the first row, HW 238 is so adjusted that it points to the last row after adjustment. After the performance of step 352, a test is again carried out during step 346 to check whether HT 239 is equal to 0. If this is not the case, the program loop formed by the steps 346 to 354 is always called up again until HW has become equal to 0. In that case, all the distances in the distance memories of the used rows of copy table 202 are updated.

Figure 8:
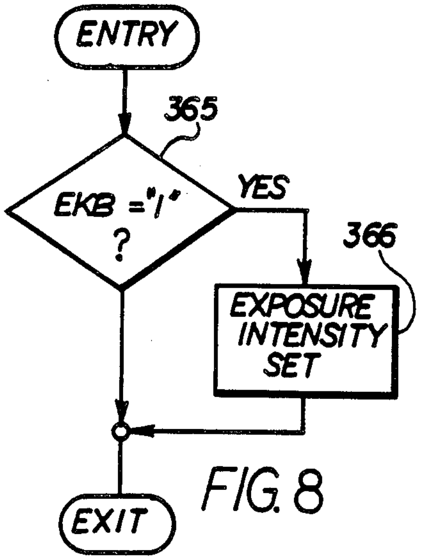

FIG. 8 represents the action routine for adjusting the exposure intensity. This action routine is called as soon as the leading edge of an imaging section reaches location V3. First of all, a test is carried out during the performance of step 365 to check whether EKB in SG(HW) is equal to 1. If not, the action routine is abandoned. If it is equal to 1, then during the performance of step 366 the required exposure intensity is called from BG of the row in order table 204 storing the data concerning the copy order in question. This row is indicated by OW(HW). Also, during the performance of step 366, the required exposure intensity is set and the action routine is abandoned.

Figure 9:
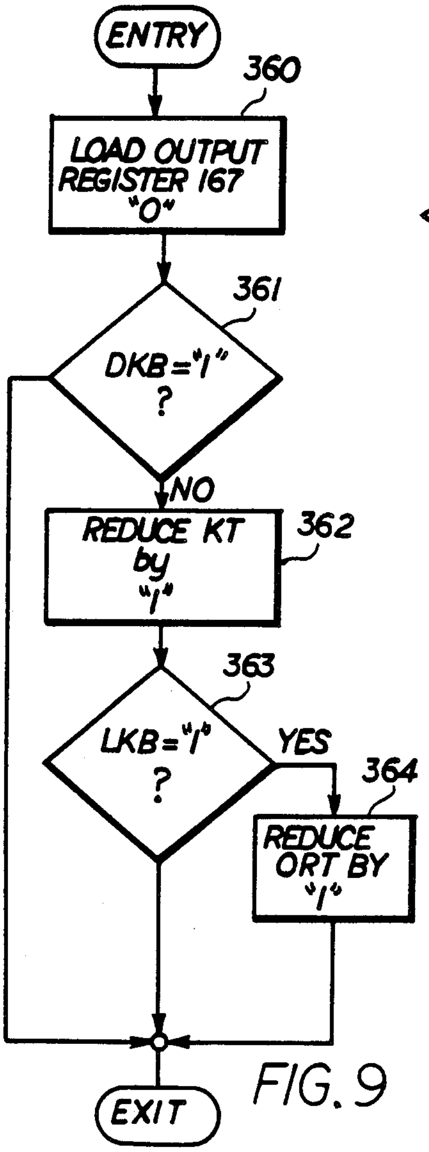

FIG. 9 represents the flow diagram of the action routine for performing the last action to form a copy. In the example described here, this is the action routine for lowering roller 68 after the heated powder image has been transferred entirely from belt 14 to the copy material fed via conveying path 69. The action routine represented in FIG. 9 consists of the steps 360 to 364.

First, in step 360, the output register 167 is loaded with a 0. As a result, roller 68 is lowered through the agency of the actuating means 174 controlled by the output signal of register 167. During the performance of step 361, a test is then carried out to check whether the DKB associated with this copy is 1. If so, the action routine is abandoned. If not, KT of the copy order for which the action is carried out is reduced by 1 during the performance of step 362. This copy counter is pointed to by OW(HW).

During the performance of step 363, a test is then carried out to check whether the LKB in SG(HW) is 1. If not, the action routine is abandoned. If it is 1, ORT 255 is first reduced by 1 before the action routine is abandoned. In this way the row in order table 204 containing the oldest copy order for which copies were still under formation is released.

Figure 10:
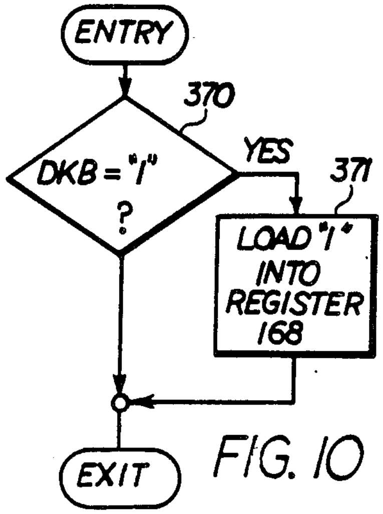

FIG. 10 represents the flow diagram of the action routine for switching on lamp 51. This action routine is called at the time when the leading edge of an imaging section has reached location V2. During the performance of step 370, a test is made to check whether DKB in the SG(HW) is 1. If not, the action routine is abandoned. If it is 1, output register 168 is loaded with a 1 during the performance of step 371. As a result, lamp 51 is switched on so that the portion of belt 1 situated beneath lamp 51 is discharged. In a similar action routine, which will, therefore, not be described in detail, and which is called as soon as the trailing edge of an imaging section has passed location B2, register 168 is again loaded with 0 so that lamp 51 is switched off by means of circuit 177.

Figure 11:
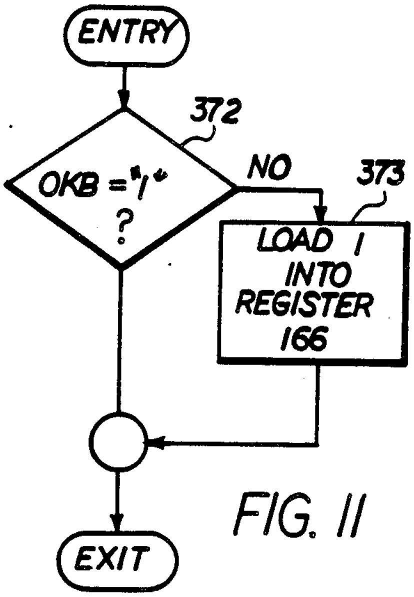

FIG. 11 represents the flow diagram of the action routine for actuating stop 50 in paper conveying path 69. During the performance of step 372, a test is made to check whether DKB in SG(HW) is equal to 1. If it is, the action routine is abandoned. If it is not, step 373 is carried out before the action routine is abandoned. During the performance of step 373, output register 166 is loaded with a 1. Consequently, stop 50 is raised by actuating means 175 so that the copy material lying in readiness against stop 50 is fed between rollers 34 and 68. Apart from the two action routines described above (FIGS. 10 and 11), DKB does not affect the other action routines.

Figure 12:
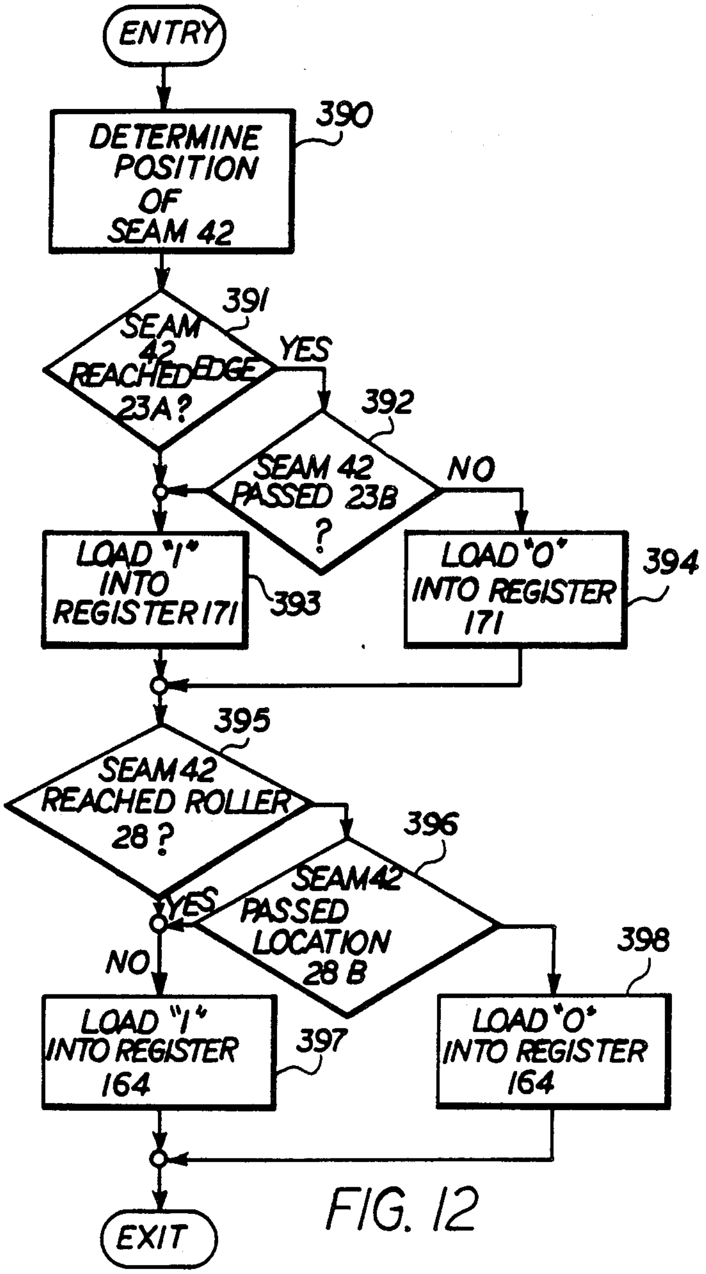

FIG. 12 represents the flow diagram of an action routine for switching off corona device 23 during the time that seam 42 is situated beneath corona device 23 and for bringing roller 28 into the auxiliary position during the time that seam 42 is taken over roller 28. The action routine in question here is called at regular intervals (e.g. every 10 milliseconds) by central processing unit 151.

After being called, the position of seam 42 is first determined during the performance of step 390 on the basis of the distance between marker 43 and seam 42 and the distance between marker 43 and detector 67. The latter distance is stored in seam position register 203.

Steps 391 and 392 are used to determine whether seam 42 is situtated beneath corona device 23. In this connection use is made of the distance between the front edge 23A of corona device 23 (see FIG. 1) and detector 67, and of the distance between the rear edge 23B of the corona device 23 (see FIG. 1) and detector 67. These distances are stored in read-only memory 155.

During step 391, a test is carried out to check whether seam 42 had reached front edge 23A. If it has not, step 393 is performed. If it has, a check is carried out in step 392 as to whether seam 42 is past the rear edge 23B. If it is, step 393 is performed. If not, step 394 is performed. During the performance of step 394, output register 171 is made 0. As a result, the output of AND gate 191 becomes equal to 0 so that corona device 23 is switched off by actuating circuit 178. During the performance of step 393, output register 171 is loaded with 1. As a result, the output of AND gate 191 will become equal to the output signal of output register 172. Output register 172 is loaded during the action routines for switching corona device 23 on and off.

By means of the steps 395 and 396, it is determined whether seam 42 is at roller 28. During the performance of step 395, a test is made to check whether sea m42 has already reached roller 28. For this purpose, use is made of the distance between location 28A (see FIG. 1) and detector 67. If seam 42 is situated in front of location 28A, in the part between detector 67 and location 28A, step 397 is performed before the action routine is abandoned. Otherwise, step 396 is performed. On performance of step 396, a test is made to check whether seam 42 is situated past location 28B (see FIG. 1), in the part between location 28B and detector 67. If it is, step 397 is performed before the action routine is abandoned. If not, step 398 is performed before the action routine is abandoned. During the performance of step 398, output register 164 is loaded with a 0. As a result, the output signal of AND gate 190 becomes equal to 0 so that roller 28 is brought into the auxiliary position. During the performance of step 397, output register 164 is loaded with a 1 so that the output of AND gate 190 becomes equal to the output signal of output register 165. Output register 165 is loaded in the action routines for the purpose of bringing roller 28 into and out of the transfer position.

Figure 13:
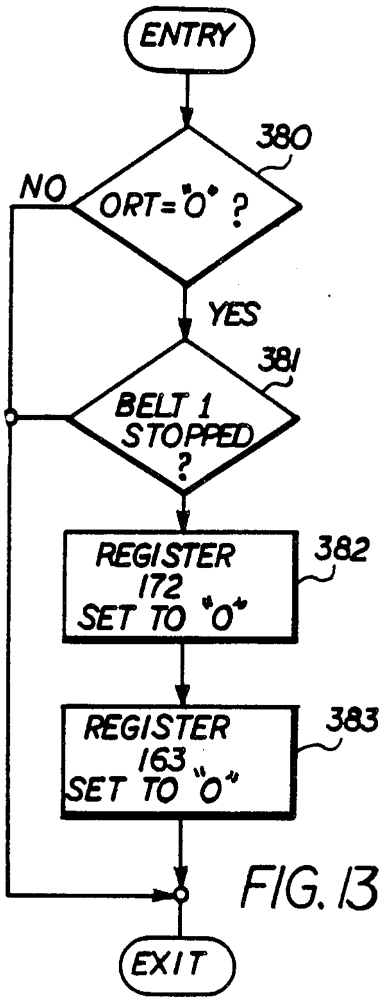

As already described above, order counter 215 is increased by 1 during the original feeding routine at the time that a new original is fed into path 54. If the last action for the last copy of an order is performed, the ORT 255 is reduced by 1 during the associated action routine. As soon as the last copy of the last order has been finished, the contents of ORT 255 will accordingly be equal to 0, and in that case, belt 1 is stopped during the performance of a so-called belt stop routine. The flow diagram of the belt stop routine is represented in FIG. 13.

During the performance of the belt stop routine, which is called at regular intervals (e.g. every 100 milliseconds), a test is carried out during step 380 to check whether the contents of ORT 255 are equal to 0. If not, the belt stop routine is abandoned. If it is, a check is carried out during step 381 to determine whether, if belt 1 is stopped, the first copy formed after restarting belt 1 will be formed on a part of belt 1 containing the seam 42. This possibility exists if the distance between location A along belt 1 and seam 42 is less than the longest permissible copy length.

When determining the distance between location A and seam 42, use is made of the distance between marker 43 and detector 67, (this distance being registered in seam position register 203), the distance between seam 42 and marker 43 and the distance between detector 67 and exposure place 59A. These last three distances and also the maximum copy length are stored in read-only memory 155.

If the determined distance is larger than the maximum copy length, steps 382 and 383 are first performed before the belt stop routine is abandoned. During the performacne of step 383, output register 172 is loaded with a 0. Consequently, servo-systems 11 and 15 and synchronous motor 8 are switched off so that belt 1 stops. During the performance of step 383, output register 163 is loaded with 0 so that roller 28 is brought into the position of rest through the agency of actuating means 123, cylinder 118, piston 117 and toggle lever 115.

Figure 14:
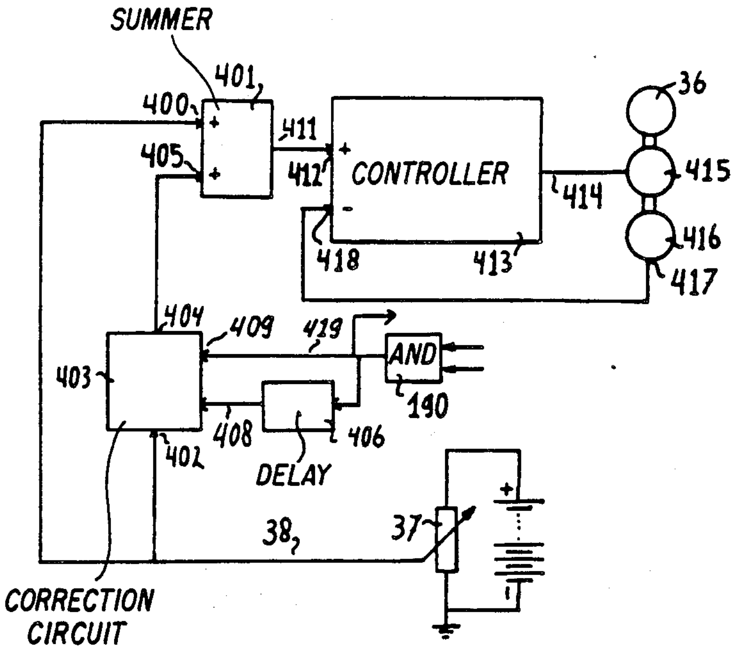
FIG. 14 is a block diagram of the servo-system for driving the intermediate support.

FIG. 14 represents the block schematic of servo-system 35 for controlling the speed of belt 14. The voltage VL1 at the slider of potentiometer 37 is fed via signal line 38 to a first input 400 of a summation circuit 401 and to an input 402 of a correction circuit 403, the latter being described in detail hereinafter. Output 404 of correction circuit 403 is connected to a second input 405 of summation circuit 401.

Control signal 419 originating from AND gate 190 is fed not only to actuating means 124 for bringing roller 28 into the transfer position but also to an input 409 of correction circuit 403 and to the input of a delay circuit 406. Delay circuit 406, in response to a 1-0 changeover of signal 419, generates a signal 408 of fixed pulse width which is delayed with respect to the 1-0 changeover. Both signal 419 and signal 408 are represented against time in FIG. 16.

Output 411 of summation circuit 401 is connected to a first input 412 of a controller 413. A servo-motor 415 is energized by a signal originating from an output 414 of controller 413. Servo-motor 415 is connected to the shaft of drive roller 36 for driving belt 14. A tachogenerator 416 is also connected to the shaft of servo-motor 415. Output 417 of tachogenerator 416 delivers a voltage proportional to the revolutions per second of motor 415 to a second input 418 of controller 413. Through controller 413, the revolutions per second of motor 415 and, hence, the speed of belt 14 are controlled in a manner known in control theory such that the voltage at inputs 412 and 418 of controller 413 remain equal to one another. The speed of belt 14 controlled in this way is thus proportional to the voltage (Vref) at the input 412 of controller 413.

Figure 15:
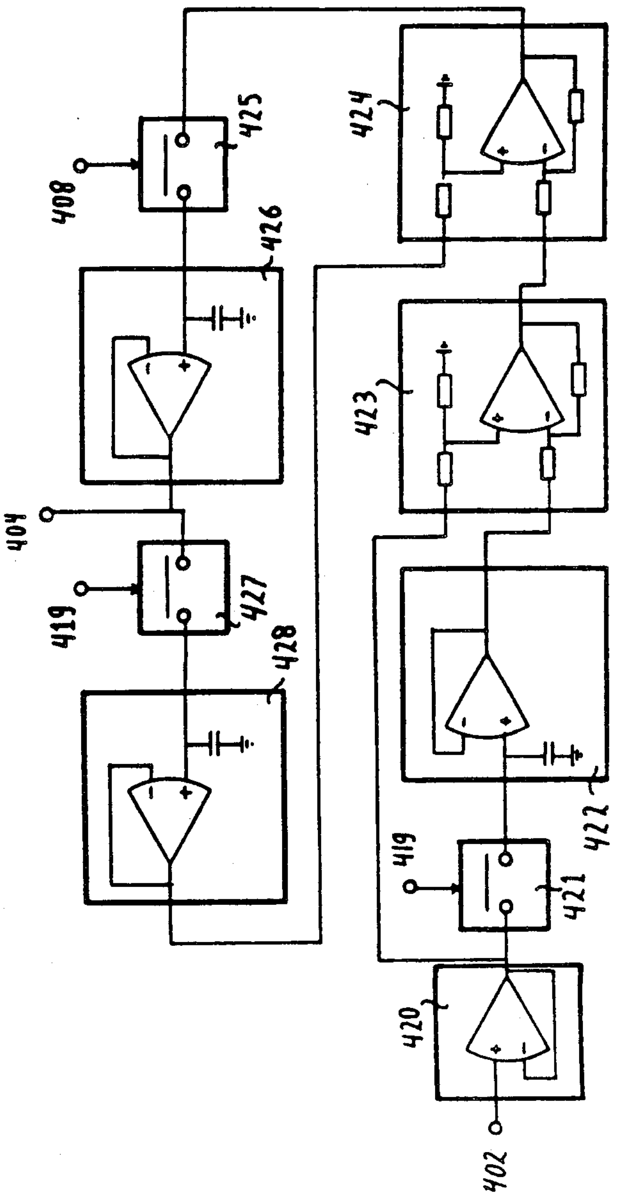
FIG. 15 is the correction circuit used in the servo-system of FIG. 14.

FIG. 15 represents the correction circuit 403 in detail. Voltage VL1 is fed to input 402 of an operational amplifier 420 connected as a voltage follower. The output of amplifier 420 is connected, via an electronic switch 421 actuated by signal 419, to an anolog memory circuit 422. The output of amplifier 420 is also connected to the positive input of a subtraction circuit 423. The negative input of subtraction circuit 423 is connected to the output of memory circuit 422. The output of subtraction circuit 423 is connected to the negative input of a second subtraction circuit 424. The output of subtraction circuit 424 is connected, via an electronic switch 425 actuated by signal 408, to a second memory circuit 426. The output of memory circuit 426 acts as the output 404 of correction circuit 403. Output 404 is connected, via an electronic switch 427 actuated by signal 419, to the input of a third memory circuit 428. The output of memory circuit 428 is connected to the positive input of subtraction circuit 424.

Figure 16:
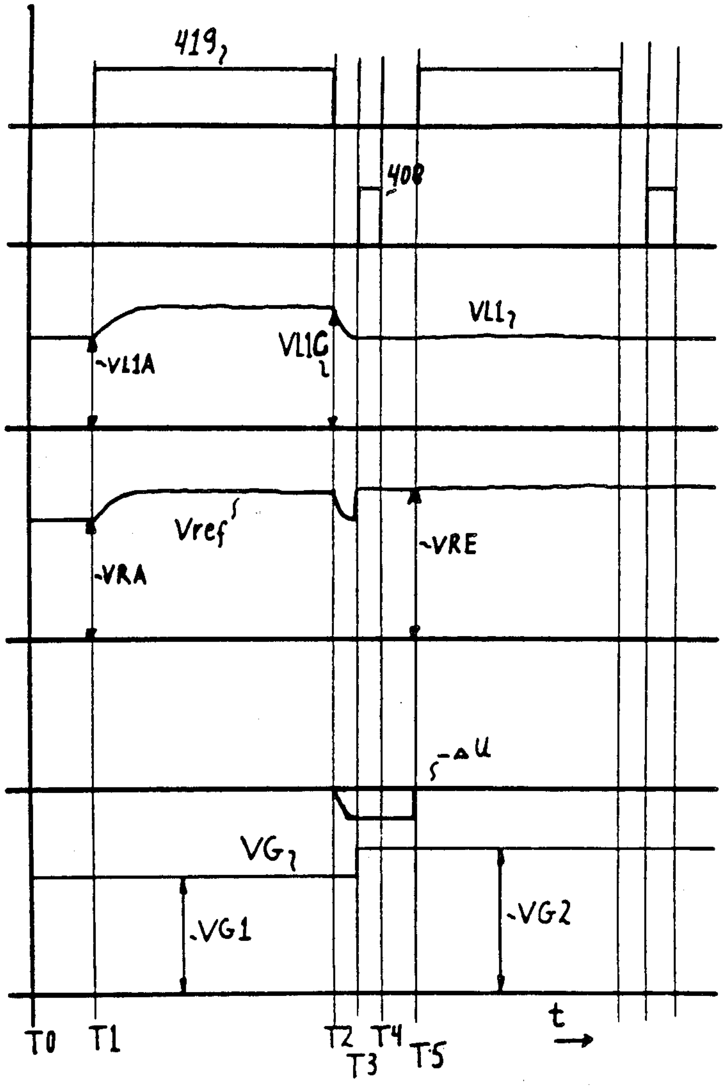
FIG. 16 is a timing diagram of a number of signals generated in the servo-system and delivered to the servo-system of FIG. 14.
Figure 17:
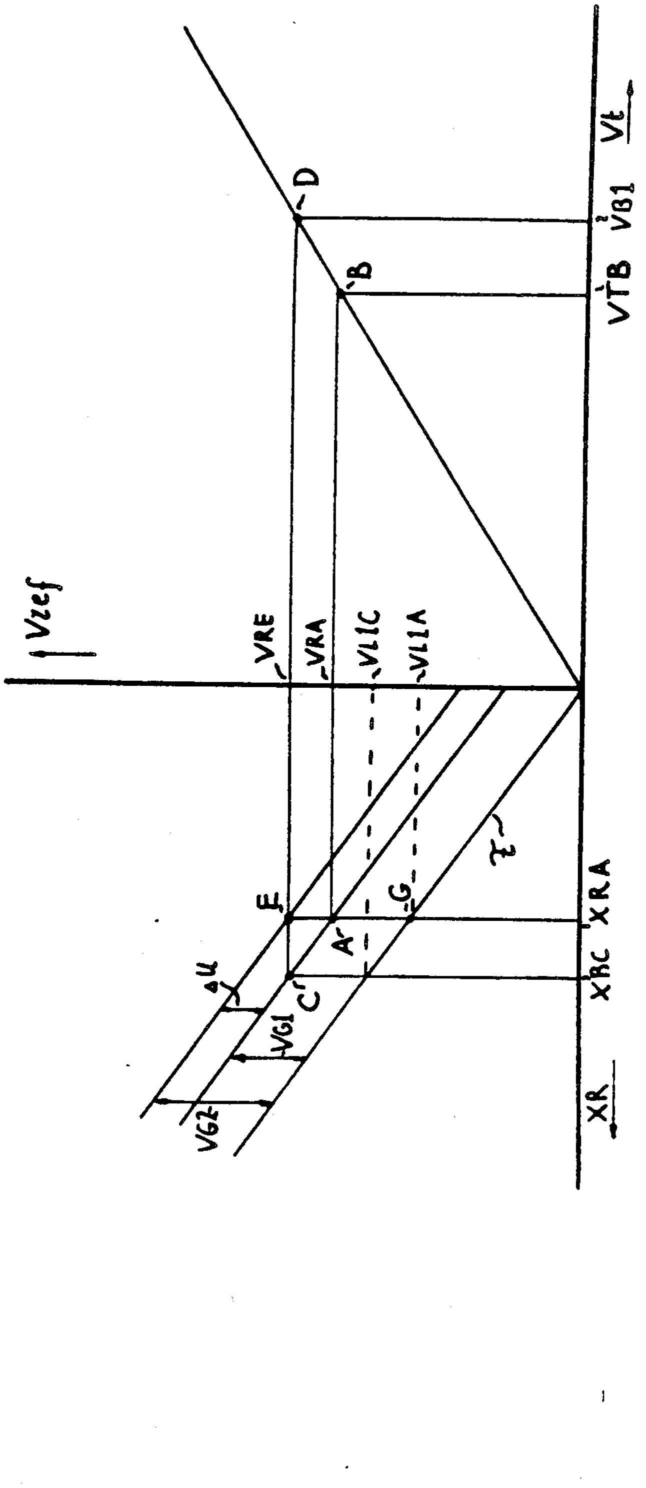
FIG. 17 shows the relationships between a number of variables occuring in the servo-system of FIG. 14.

The operation of servo-system 15 will be described hereinafter with reference to FIGS. 16 and 17. FIG. 16 represents the signals 419 and 408, voltage VL1, voltage Vref, voltage $-\Delta U$ at the output of subtraction circuit 423, and voltage VG at output 404 against time. FIG. 17 represents the speed Vt of belt 14 against the voltage Vref and, for a number of values of VG, the voltage Vref as a function of the position XR of roller 27 with respect to block 32. Line F denotes Vref as a function of XR for VG=0. In that case, Vref is equal to VL1.

Assuming that the output of output register 164 is equal to 1 at time T0 and the output signal for register 166 is equal to 0, then signal 419 will be equal to 0, roller 28 will be in the auxiliary position and, thus, roller 27 will be locked. XRA in FIG. 17 denotes the position in which the roller 27 is locked. G denotes the voltage VL1A associated with XRA at the slider of potentiometer 37. The voltage VG at the output 404 of correction circuit 403 is equal to VG1.

The voltage Vref (VRA) associated with XRA is accordingly equal to the sum of VL1A and VG1. The speed of belt 14 associated with the voltage VRA is denoted by VTB. In the case under examination here, the speed VTB of belt 14 is not equal to the speed VB1 of belt 1. If at time T1 roller 28 has to be brought into the transfer position, signal 419 will become equal to 1. As a result, the electronic switches 421 and 427 are closed. Also, belt 1 is pressed against belt 14. In these conditions, belt 1 assumes the speed VTB of belt 14 at the pressure zone.

Since the speed at which belt 14 carries off belt 1 is lower than the speed VB1 at which the synchronous motor 8 supplies belt 1, roller 127 will move towards potentiometer 37. As a result of this movement, the voltage VL1 and, hence, also the speed VT of belt 14 will increase. The speed VT will continue to increase until roller 27 has moved to such an extent that the voltage Vref has reached a value at which the speed of belt 14 has become equal to the speed VB1. The position associated with this speed is denoted by XRC in FIG. 17.

At time T2, signal 419 again becomes 0 so that switches 421 and 427 are opened. The voltage at the outputs of memory circuits 422 and 428 are, thus, fixed at a value equal to the value of the output at time T2. This voltage is equal to VG1 for circuit 428, and this voltage is equal to slider voltage VL1C at time T2 for circuit 422. Also, as a result of the 1-0 changeover of signal 419, roller 28 is brought into the auxiliar position and roller 27 is brought back to position XRA in which it is locked. As a result, the voltage VL1 will fall off again.

The voltage−ΔU at the output of subtraction circuit 423 now indicates the difference between the slider voltage VL1A in the case of a locked roller 27 and the voltage at the output of memory circuit 422, which latter voltage is representative of the slider voltage VL1C as it was at time T2. The voltage at the output of subtraction circuit 424 is now equal to VG1+ΔU. At time T3, signal 408 becomes equal to 1 and the voltage at the output of memory circuit 426 becomes equal to the value VG1+ΔU. Consequently, the voltage Vref increases by a value ΔU so that Vref again becomes equal to the value of Vref at time T2, at which value the speed Vt of belt 14 was equal to the speed VB1. This voltage is denoted by VRE in FIG. 17.

At time T4, signal 408 again becomes 0 so that switch 425 is again opened. Consequently, the voltage at output 404 is fixed at the value VG2. If signal 419 again becomes 1 at time T5, belt 1 will again be brought into contact with belt 14. As a result, belt 1 will again be driven by belt 14. Since the speeds of belt 1 and belt 14 before being brought into contact were already equal to one another, the speed of belt 1 at the pressure zone will not change.

If, as a result of a change in the system parameters or for any other reason, the speeds of belt 1 and belt 14 are no longer equal to one another during the interval of time when the belts are disngaged from one another, the output voltage at output 404 will always be adjusted as described above so that after adjustment the speeds of the belts are again equal to one another in the free-running condition. This results in reduced wear on belts 1 and 14. Also, the distance over which an image is entrained by belts 1 and 14 always remains the same so that the time required to bring an image from exposure place 59A to roller 68 always remains the same and, hence, the time at which copy materials have to be introduced between rollers 34 and 68 is always known.

While presently preferred embodiments of the invention have been described and shown in the drawings with particularity, the invention may be otherwise embodied within the scope of the appended claims.

What is claimed is:

1. A method of controlling an image forming device in which images are formed on an advancing medium wherein the position of an image with respect to an initial position is registered by counting periods of a pulse signal, the frequency of which is proportional to the speed at which the medium is advanced,and wherein the registered positions are repeatedly compared with a number of predetermined positions with control signals being generated if the compared positions are identical, the improvement wherein (a) a plurality of images can be under formation at one time and both a first position related to the leading edge and a second position related to the trailing edge are registered for each image under formation;

(b) the predetermined positions are divided into a first and a second group, which groups are related to respectively a leading edge action table and a trailing edge action table;

(c) each first position is compared with the predetermined positions from the first group to determine whether and what action by the image forming device is necessary; and (d) each second registered position is compared with the predetermined positions from the second group to determine whether and what action by the image forming device is necessary.

2. A device for implementing the method of claim 1 having a memory, a pulse generator for generating the pulse signal, a means for comparing the registered positions with the predetermined positions and a means for generating control signals when the compared positions are identical wherein (a) the predetermined positions belonging to the first group are stored in a first part of the memory;

(b) the predetermined positions belonging to the second group are stored in a second part of the memory; and (c) the device is provided with counting means which register the first and second positions for each image under formation.

* * * * *

UNITED STATES PATENT AND TRADEMARK OFFICE
CERTIFICATE OF CORRECTION

PATENT NO. : 4,705,391

DATED : November 10, 1987

INVENTOR(S) : Peeters et al.

It is certified that error appears in the above-identified patent and that said Letters Patent is hereby corrected as shown below:

Item [73] on front page: please delete --Switzerland-- and insert "Netherlands".

Column 3, line 33: please delete --agains-- and insert "again".

Column 3, line 49: please delete --sectio-- and insert "section".

Column 4, line 37: please delete --couled-- and insert "coupled".

Column 5, line 3: please delete --awar-- and insert "away".

Column 5, line 4: please delete --displacrement-- and insert "displacement".

Column 5, line 34: please delete --reached-- and insert "reaches".

Column 6, line 28: please delete --sid-- and insert "side".

Column 6, line 46: please delete --extend-- and insert "extent".

Column 10, line 27: please delete --205 and 208-- and insert "205 to 208".

UNITED STATES PATENT AND TRADEMARK OFFICE

CERTIFICATE OF CORRECTION

PATENT NO. : 4,705,391

DATED : November 10, 1987

INVENTOR(S) : Peeters et al.

It is certified that error appears in the above-identified patent and that said Letters Patent is hereby corrected as shown below:

Column 10, line 42: please delete --be-- and insert "by".

Column 10, line 43: please delete the --hyphen-- after "AT".

Column 11, line 17: please insert ",B3" after "and B3".

Column 11, line 35: please delete --to-- and insert "of".

Column 11, line 42: please delete --actiont able-- and insert "action table".

Column 15, line 49: please delete --33-- and insert "333".

Column 16, line 3: please delete --abondoned-- and insert "abandoned".

Column 16, line 5: please delete --abondoned-- and insert "abandoned".

Column 16, line 25: please delete --performacne-- and insert "performance".

Column 16, line 37: please delete --tailing-- and insert "trailing".

Column 18, line 50: please delete --sea m42-- and insert "seam 42".

UNITED STATES PATENT AND TRADEMARK OFFICE
CERTIFICATE OF CORRECTION

PATENT NO. : 4,705,391

DATED : November 10, 1987

INVENTOR(S) : Peeters et al.

It is certified that error appears in the above-identified patent and that said Letters Patent is hereby corrected as shown below:

Column 20, line 40: please delete --TO-- and insert "$\underline{T}_{\underline{O}}$".

Column 20, line 61: please delete --127-- and insert "<u>27</u>".

Column 21, line 40: please delete --disngaged-- and insert "<u>disengaged</u>".

Signed and Sealed this

Fourth Day of October, 1988

*Attest:*

DONALD J. QUIGG

*Attesting Officer* *Commissioner of Patents and Trademarks*